United States Patent [19]

Roberg et al.

[11] 4,095,927
[45] Jun. 20, 1978

[54] APPARATUS FOR BLOWING, COMPRESSING, AND SEVERING TO FORM AN ARTICLE

[75] Inventors: Paul Roberg, Hilchenbach; Bernhard Löbbert, Bergneustadt; Christof Paschke, Hilchenbach; Hermann Staehle, Stuttgart; Wulf Kamp, Kelkheim; Manfred Dicks, Niederhausen; Otto Plajer, Kelkheim, all of Germany

[73] Assignees: Schloemann-Siemag Akt., Dusseldorf; Hoechst Aktiengesellschaft, Frankfort, both of Germany

[21] Appl. No.: 722,568

[22] Filed: Sep. 13, 1976

[30] Foreign Application Priority Data

Sep. 13, 1975 Germany .............................. 2540910
Oct. 6, 1975 Germany .............................. 2544680

[51] Int. Cl.² ............................................. B29D 23/03

[52] U.S. Cl. ..................................... 425/525; 425/527; 425/302.1
[58] Field of Search .................... 425/292, 296, 302 B, 425/525, 527, 302.1

[56] References Cited

U.S. PATENT DOCUMENTS

| 3,173,174 | 3/1965 | Edwards | 425/292 |
| 3,338,997 | 8/1967 | Tigner | 425/292 X |
| 3,357,053 | 12/1967 | Lyon et al. | 425/292 |
| 3,869,237 | 3/1975 | Hellmer et al. | 425/292 |

*Primary Examiner*—Richard B. Lazarus
*Attorney, Agent, or Firm*—Norman S. Blodgett; Gerry A. Blodgett

[57] ABSTRACT

Apparatus for the extrusion blow molding of hollow bodies from thermoplastics with means forming a reinforced lip by upsetting and means severing a wall of the article in the mold.

2 Claims, 4 Drawing Figures

APPARATUS FOR BLOWING, COMPRESSING, AND SEVERING TO FORM AN ARTICLE

BACKGROUND OF THE INVENTION

Extrusion blow molding permits the fabrication of bodies of a rather intricate geometric design to be formed from a simple, extruded tube. The wall thickness of the hollow body thus produced depends on that of the tube and on the blow ratio. It it true that wall thickness of the hollow body may be additionally influenced by nozzle configuration and the regulation of the wall thickness of the extruded tube; the range of variation that is obtainable in that way is, however, too small for certain applications and the gradation of wall thickness necessary for fabricating ribs or the like cannot be attained.

The patent DT-OS 1,479,563 as well as the patent DT-AS 1,176,829 teaches the use of blow molds with movable parts that can be actuated for the molding of handles in canisters or for turning the inside of the bottom of hollow bodies, respectively. The patent Fr-PS 1,441,727, the patent DT-AS 1,130 151, as well as the patent DT-AS 1,245,579, disclose movable parts of blow molds by means of which reinforcing ribs may be formed.

According to the patent FR-PS 1,441,727, the movable tool parts are withdrawn before the blowing starts, so that pocket-like enlargements are provided that the tube wall enters into during the blowing. By advancing these parts before cooling the plastic material, the intruded wall area is folded and welded at the regions of contact.

According to the patent DT-AS 1,130,151 as well as the patent DT-AS 1,245,579, tool parts that limit an enlargement of the mold pocket are so advanced against one another, after the blowing and before the cooling of the thermoplastic material, that the material blown into the enlargement is upset into a rib or into an aperture, respectively.

In order to keep open and to calibrate the aperture of a hollow body, it is know, for example, from patent DT-AS 1, 176,829 to insert a mandrel into this aperture. In order to cut apertures in hollow bodies after their cooling a multiple cutting ring has been proposed by the patent DT-OS 2,163,144 in conjunction with a bearing ring which may also be located in the blow itself. Especially in cutting in the mold, the periphery of the aperture in the hollow body has to be so designed that it can spring back in cutting direction. Cutting tools of the described design have, therefore, only a limited applicability.

The patent DT-AS 1,100,936 as well as the patent DT-AS 1,174,968 describe blow molds with contrivances for the severing of a wall area of a hollow body in order to form a defined aperture. A disadvantage that appears is that the cutting parts of the tool are guided by supporting surfaces, so that the specific lift has to be held within close tolerances and is, therefore, critical.

In connection with mass production items, especially on drinking cups, one tries to work with only a limited amount of material. In the case of extrusion blowing, to be sure, it is possible to obtain minimal wall thickness of the product if the customary thermoplastic plastics are processed in such a manner that the plastic tube is extruded with a small wall thickness; because of the desired mechanical properties of the hollow body, there exist, however, limits to the reduction of the wall thickness that cannot be exceeded through contouring, e.g. upset ribs.

Furthermore, in a number of cases it is found to be undesirable that hollow bodies of slight wall thickness are poor thermal insulators: For example, thin walled cups filled with hot beverages can only be briefly held in the hand without unpleasant heat effects; and ice cream filled into such cups melts in them with undesirable speed because of the absorption of heat. These and other difficulties experienced with the prior art devices have been obviated in a novel manner by the present invention.

It is, therefore, an outstanding object of the invention to provide apparatus for the extrusion blowing of hollow bodies that permits the fabrication of mechanically stable and thermally insulating hollow bodies using a minimum amount of material.

With this and other objects in view, as will be apparent to those skilled in the art, the invention resides in the combination of parts set forth in the specification and covered by the claims appended hereto.

SUMMARY OF THE INVENTION

In general, this task is solved by the fabrication of hollow bodies from foam plastics by means of upsetting and simultanious pressing the foam structure in the aperture region of the hollow body in such a way that it is compressed to at least 1.5 times the density of the foamed hollow body wall. The separating tool part that creates the aperture, after the upsetting and severing, touches the inside of the hollow body wall tangentially. The separating of the region of the hollow body that covers the aperture can be accomplished subsequent to the upsetting and pressing, or simultaneously with it. The separating is preferably effected by punching. It has proved beneficial additionally to calibrate the inside of the aperture of the hollow body in a known manner.

It has been found advisable to employ for the foam plastics polystyrene with 2 to 10%-by-weight (relative to the polystyrene) of halogenated hydrocarbons. It has been recognized as desirable to limit the pressure of the blowing has a density of at most 300 g/dm$^3$, i.e., 18.9 lbs./ft.$^3$.

In order to carry out the method, apparatus has been used that has a divided blowing tool with at least one mold pocket, an axially-movable setting ring, and an axially-movable separating punch, as well as means for guiding the upsetting ring and the separating punch and for limiting the sliding path of the upsetting ring and separating punch. The separating punch extends, in accordance with the invention, after the separating, across the modeling inner edge of the upsetting ring into the neck region of the mold pocket.

It has proved useful to equip the upsetting ring in the head area of the mold pocket with a circular cross-sectional taper that is located free of the blow molds and that forms (free of offsets) with the separating edge of the separating punch a part of the head area of the mold pocket.

It has been found to be desirable that the separating edge of the separating punch sever the head of the hollow body along the cross-sectional taper while forming a ring.

It was recognized as desirable to equip the neck area of the mold pocket below the cross-sectional enlargement for the reinforced aperture of the hollow body with a cylindric section into which the separating punch emerges during the operation. The plunging of the separating punch into the lower neck area of the mold pocket has an additional advantage for the internal calibration of the reinforced neck of the hollow body.

It has shown as being essential that the hollow body fabricated out of foamed plastics be equipped with a stiffened, upset marginal area whose edge has no burr and whose density displays at least the 1.5 times the density of the foamed hollow body wall.

BRIEF DESCRIPTION OF THE DRAWINGS

The character of the invention, however, may be best understood by reference to one of its structural forms, as illustrated by the accompanying drawings, in which:

FIG. 1 shows a blow mold which is separable along its center line to receive an extruded tube. The mold halves 1 and 2, afer receiving the extruded tube, are moved together into the illustrated position and enclose the mold cavity 3. The mold halves 1 and 2 have shoulders 4 which form a divided ring with an external, cylindrical guide surface 5 along which a two-part upsetting ring 7,7 is movable. The parts of the upsetting rings 6,7 are mounted on holding plates 8,9 to which is connected a piston rod 10 and a pneumatic cylinder 11, by means of which the upsetting ring 6,7 is controlled and is movable axially, while limited by stops, not shown.

Figure 1:
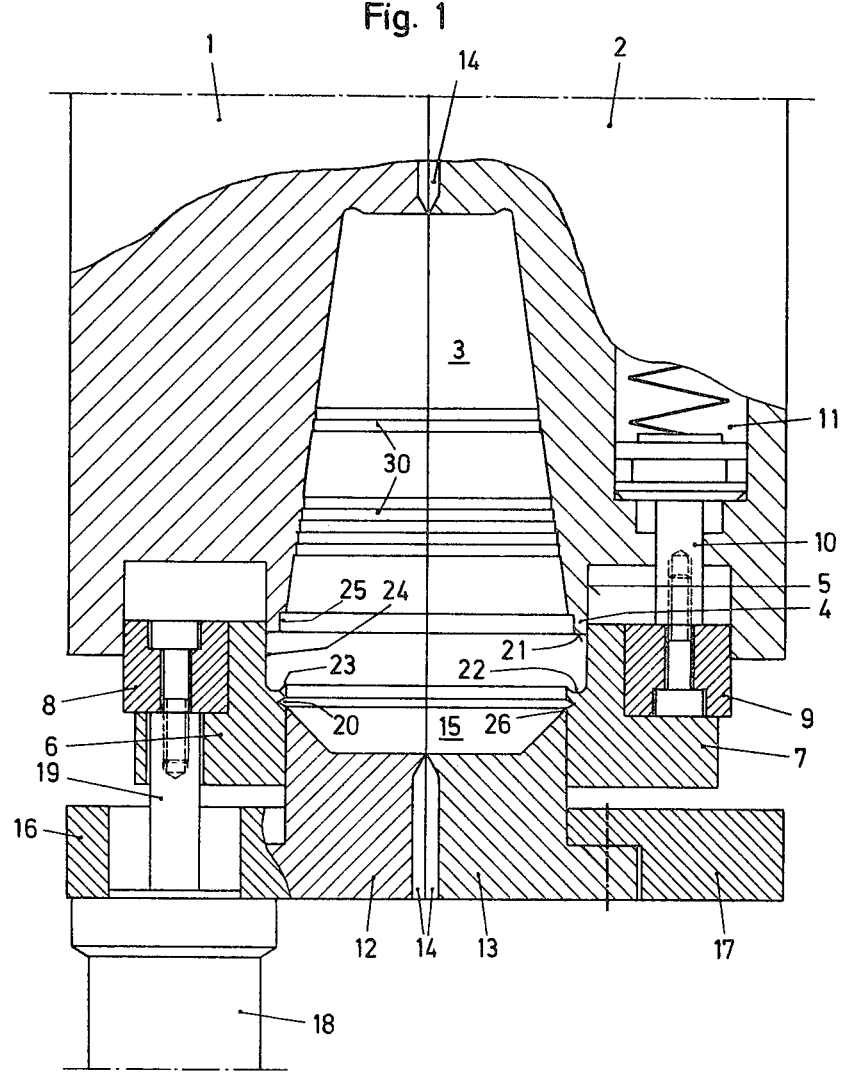
FIG. 1 is a longitudinal sectional view of apparatus for fabricating a drinking cup, the section being taken normal to its division.

The holding plates 8,9 have a cylindrical guide surface, by means of which they enclose a two-part separating punch 12,13. The parts of the separating punch have, as well as the opposite sides of the mold cavity of the mold heads 1 and 2, squeeze pockets 14 which taper towards the mold pocket 3 and form thereby a cutting edge. The front of the separating punch 12,13 is provided with an indentation 15. The parts of the separating punch are connected to supporting pieces that are equipped with pneumatic cylinders 18, whose piston rods 19 engage the holding plates 8,9.

Figure 2:
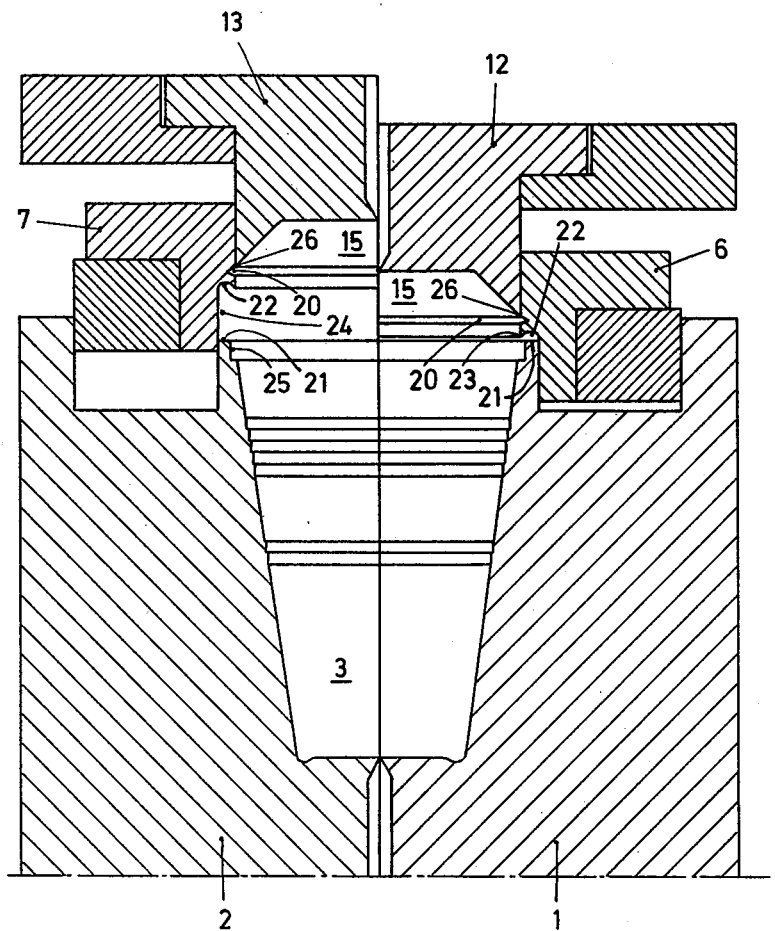
FIG. 2 is a sectional view of the apparatus showing the parts of the apparatus of FIG. 1 surrounding the mold pocket, the parts being shown in two semisections, representing two working positions.
Figure 3:
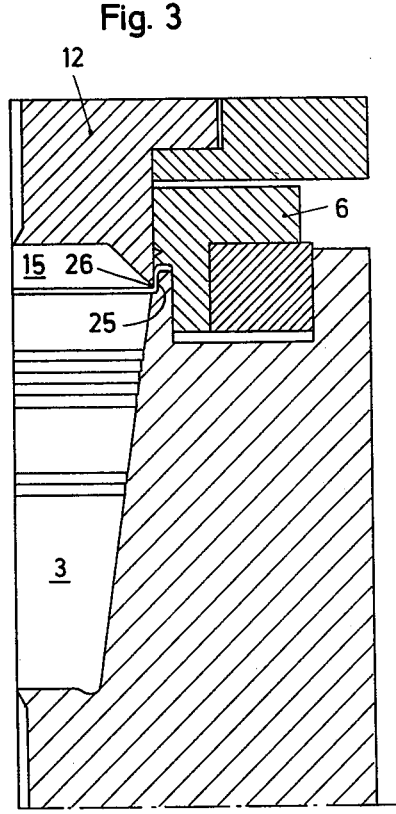
FIG. 3 is a sectional view of the apparatus showing the end position.

As is well known in the extrusion blow molding of hollow bodies from thermoplastic plastics, the mold halves 1,2 of the blowing mold are first separated in order to receive the extruded tube. To fabricate a drinking cup, selected here as example of an embodiment, a section of a plastics tube that is still in a plastic phase and foaming (because of its foaming agent) is centrally introduced. The mold halves are then moved together in accordance with FIG. 1 and FIG. 2 left. The tube is thereby closed through the squeeze pockets 14. In the area of the separating punch 12,13 and preferably in the plane of separation, a blow needle is stuck into the tube and provided with a pressure medium, so that the tube is plastically expanded and blown in the mold cavity 3. The type and amount of the foaming agent, as well as the pressure applied in blowing, are so selected that the foam plastics exhibit the desired density, which expendiently does not exceed 300 g/dm$^3$, i.e., 18.9 lbs./ft$^3$. At the end of the blowing process the wall of the expanded tube is located on all sides against the surface of the mold cavity 3, including the indentations 15 and 20 in the head area. It has also penetrated into the region 24 standing between the interface 21 and the groove 22. Now, the pneumatic cylinders 11, of which only one is depicted in FIG. 1, are actuated and, by means of their pistons 10, they draw the holding plates 8,9 with the upsetting ring 6,7 and the separating punch 12,13 against the mold cavity 3 until the position illustrated in FIG. 2 (right semisection) has been reached. In that way the material standing between the interface 21 and the groove 22 is first upset and, in the final phase of the movement additionally pressed. The increase of pressure occurring in that way causes a compression of the material, whose density is raised to the 1½ times the density of the other parts of the hollow body. This pressure increase causes the cross-sectional profile remaining (according to the right semisection of FIG. 2) between the interface 21 and the groove 22 to be correspondingly smaller than the cross-section of the material that has penetrated during the blowing into the area 24 shown in the left semisection. The increase in pressure occurs in such a way that the molded inner edge 23 (whose radius is smaller than that of the cylindric section 25 by about the thickness of the wall of the hollow body) is advanced in the direction of section 25. The increase in pressure is already quite considerable when the modeled inner edge 23 approaches the interface 21, but it is also possible to advance the modeled inner edge 23 to the level of interface 21 or even beyond it. It is essential to avoid the wall becoming weakened by the modeled inner edge.

Figure 4:
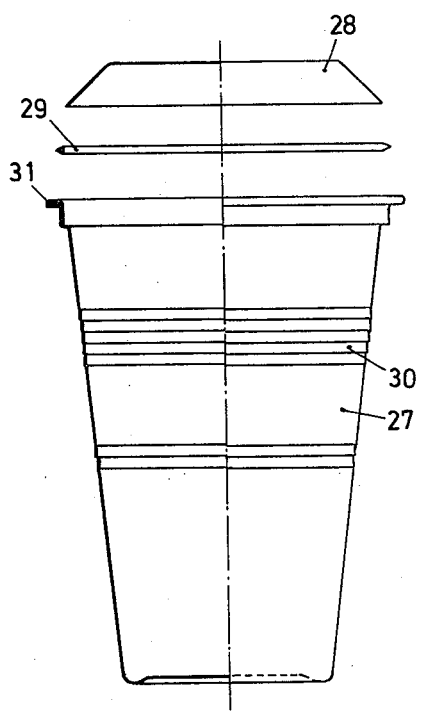
FIG. 4 shows a hollow body fabricated with the apparatus of FIGS. 1 and 2 partially sectioned with head parts severed above the aperture, representing its opening.

In the exemplified embodiment, the separating punch 12,13 is subsequently advanced. In that way, its edge 26 first presses the material that has penetrated into the circular indentation 20 together and then shears it off, so that the blown hollow body becomes divided, as shown in FIG. 4, into the drinking cup 27, a head 28 and a ring 29. By further actuation of the pneumatic cylinders 18, the piston rods 19 pull the separating punch 12,13 further until its edge 26, tangentially touching the inner wall of the blown part, emerges into the cylindric section 25. In this way, the inner wall of the aperture area of the hollow body becomes calibrated and the material that extends between the circular indentation 20 and the molded inner edge 23 is pressed (during the calibrating ) against or into the wall. In that way it is also possible to avoid cutting into the wall of the hollow body in order to prevent any notch effect.

After adequate cooling and consequent hardening of the hollow body, the blow mold is opened and the hollow body is removed from it. The lost head 28 with the associated flash is hereby discarded, the same as the flash which extends out and is severed at the bottom of the hollow body. The hollow body itself, which in the exemplified embodiment is a drinking cup 27, can be fabricated with minimal wall thickness, e.g. 0.4 mm, with low density and, thus, with a minimal amount of material. It is, however, without being limited to this wall thickness which is merely mentioned by way of example, or to its dimension. The stiffness which is critical on such minimal amount of material used may be increased, to begin with, by the use of cellular or foamed material which simultaneously furnishes also the desired thermal insulation. The stiffness is additionally increased in the well-known manner in that the wall of the cup 27 of FIG. 4 is provided in the regions 30 with circular contouring, effected through a corresponding modeling of the mold cavity 3 of FIG. 1. The stiffness which on the usual hollow bodies with wide openings decreases towards the area of the opening or the free end is substantially increased on cup 27 of FIG. 4. Due to the described upsetting and pressing in the opening area, a ring 31 is created which not only exceeds in height and width the wall thickness in the opening area, but which, moreover, additionally stiffens it due to increased, i.e., doubled density of the foam plastic.

It has proved advantageous to fabricate this rim 31 due to the pressing with a smooth surface and practically free from burrs; also, its inner surface is calibrated by the ingression of the separating punch and shows no projecting burr whatever.

In the exemplified embodiment the procedure is first of all carried out by upsetting with subsequent compression and subsequent separation of head 28 and ring 29. It is also possible to jointly actuate the pneumatic cylinders, so that separating and calibrating are carried out simultaneously with the upsetting and pressing. Furthermore, it is also possible to advance first the separating punch 12,13 and only then to advance the upsetting ring 6,7. In that way, the front region of separating punch 12,13 enters into the cylindrical section 25 before the full pressure is attained in the region 24, so that a practically complete seal is achieved against the mold cavity 3. At the same time, a simplified drive can be employed.

The cylindrical section 25 ensures not only the desired tangential engagement of the separating edge 26, but also ensures that the hollow bodies are capable of being stocked.

Practically all thermoplastic plastics are suited as the plastics for this method. Preferable employed are polystyrene, mixed polymerizates of styrene with up to 30%-by-weight, preferably up to 20%-by-weight, of comonomeres, e.g., methyl styrene and/or acrylonitrile and latex-modified shockresistant polystyrenes, such as e.g. polymerizates of styrene or of styrene and acrylonitrile or mixtures of these polymerizates grafted onto polybutadiene, butadiene-styrene-latex or ethylene-propylene-diene-latex.

As foaming agents it is possible to use chemical foaming agents, such as azodicarbonamide, as well as also physical foaming agents, e.g. hydrocarbons, such as pentane or propane, halogenated hydrocarbons or gas, such as nitrogen or carbon dioxide. Preferred are halogenated hydrocarbons, e.g. methylene chloride, dichlorodifluoromethane, trifluoromethane, dichlorotetrafluoroethane, trichlorotrifluorethane, octafluorocyclobutane or mixtures of these foaming agents.

The amount of these foaming agents depends on the polymerizate and the type of foaming agent used. In the case of chemical foaming agents there are employed, as a rule, 0.1 to 3, preferably 0.3 to 1.5%-by-weight, relative to the polymerizate. In the case of physical foaming agents an addition of 1 to 20, preferably 2 to 10%-by-weight, relative to the polymerizate, has proven successful.

The foaming agents can be contained in the basic granulate, they can be mixed with the polymer before processing, or they can be dosed in the foaming-agent-free melted mass in the extruder.

To obtain a uniform, fine-cell foam there are preferably added pore regulators, such as e.g. a stoichiometric mixture of citric acid and sodium bicarbonate, in amounts of 0.01 to 5, preferably 0.1 to 1%-by-weight, relative to the polymerizate. To the material may be further added other customary additives, such as fillers, pigments, dyes, stabilizers, antistatics, flameproofing agents, or mold release agents. If required, the different additives are mixed in with the addition of bonding agents, e.g. butyl stearate or mineral oil.

The pressure used for blowing is so adjusted that under its effect the plastic foam material reaches the desired thickness. The above-named decrease of the volume involved in the upsetting process yields the desired amount of a least a 1 ½ times increase in density of rim 31 over that of the remaining wall regions of the hollow body. With customary foaming agents the aforesaid density can be achieved, for example, with blowing pressures of 3 to 15 atu (42 to 215 PSIG), while the compression of the rim is achieved through additional pressing; with the application of high pressure the density of the rim area can be increased to that of compact, cell-free plastics.

The separating process can be effected by punching, shearing, cutting, but also by splitting off. On the exemplified embodiment it is favorably noticeable that the separating tool works free from burrs and simultaneously calibrates the inside of the opening of the hollow body.

The invention is not limited to the fabrication of the illustrated drinking cup 27; any optional hollow body, e.g. Bottles, boxes, kegs, drums or the like can be blown out of foamed thermoplastic plastics and be stiffened or reinforced, respectively, through the foaming of upset and compressed rim areas.

The hollow bodies can be used with open mouth, for example, as drinking cups. But it is also possible to close the fabricated reinforced and compressed openings. Thus, for example, for the sale of ice cream, covers can be pressed into the aperture range, can overlap the rim, can be glued or fused to it or the like. The hollow bodies may have, for example, a square cross-section, whereby advantageously the corner regions are beveled and/or rounded off. It is also possible to fabricate the hollow body with another cross-section than its opening.

To increase production the foaming mold can be constructed as a double-tool; beneficially the double-tool is so designed that the blowing tools stand symmetrically one below the other, whereby advantageously the movable parts face one another. But it is also possible to have the arrangement in such a way that the movable parts are provided facing away from each other or facing into identical directions; the blowing tools may also be arranged side-by-side. Such multiple-tools may be simplified in that the driving devices jointly move the corresponding tool parts of several blowing tools. In any case there result hollow bodies that are stiffened by foamed walls and a burr-free reinforced and compressed rim that closes the aperture area and which, despite minimal expenditure of material, satisfies definite demands.

It is obvious that minor changes may be made in the form and construction of the invention without departing from the material spirit thereof. It is not, however, desired to confine the invention to the exact form herein shown and described, but it is desired to include all such as properly come within the scope claimed.

We claim:

1. Apparatus for carrying out blow molding of a plastic parison, comprising:

(a) means providing an axially extending parison, (b) a divided blowing mold having at least one cavity, said cavity having a circular opening at one end, having a counterbore at its edge, which cavity opening is coaxial to the parison, the mold also having an annular guide groove coaxial of and spaced outwardly of the cavity opening, (c) means inflating the parison in the mold to conform to the cavity, (d) a divided annular upsetting ring having a bore with a diameter which is slightly less than the counterbore diameter, and having a recess along its lower inside edge with a diameter substantially equal to the inside diameter of the guide groove, thereby allowing the recessed end of the upsetting ring to be slidable in the guide groove, means being attached thereto for moving the upsetting ring coaxially of the mold whereby a portion of the blown parison is compression molded into an article, and (e) a divided separating punch which is generally cylindrical with an outer diameter substantially equal to that of the bore in the upsetting ring, which punch is inserted in the upsetting ring so as to be attached to the upsetting ring for sliding in an axial direction relative thereto, said punch having a frusto-conical recess opening onto its mold-directed end, said recess having its large diameter at the free end, means being attached to the separating punch to move it coaxially of the upsetting ring to sever portions of the compression and blow molded article.

2. Apparatus as recited in claim 1, wherein the upsetting ring has a V-shaped groove at an intermediate portion of its bore, the radial surface of the upsetting ring recess extending outwardly from the bore having substantially semi-circular cross-section, wherein the upsetting ring and the separating punch are of such dimensions that in a first position a closed chamber is formed which contains an elongated annular space formed on two sides by the upsetting ring recess and on one side by the mold surface, the V-shaped groove, the separating punch recess, and the mold cavity, and a second position in which the elongated annular space is decreased in cross-section by the mold cavity-directed motion of the upsetting ring and the separating punch movement toward the mold cavity over the V-shaped groove to a point wherein its mold cavity-directed end protrudes substantially into the counterbore of the mold cavity opening.

* * * * *